340-566
SR
XR 3,169,166 566
Feb.
3,169,166
SEARCH R
SOUND DETECTION SYSTEM AND ALARM SYSTEM
SUBSTITUTE FOR MISSING XR
Filed Oct. 21, 1959
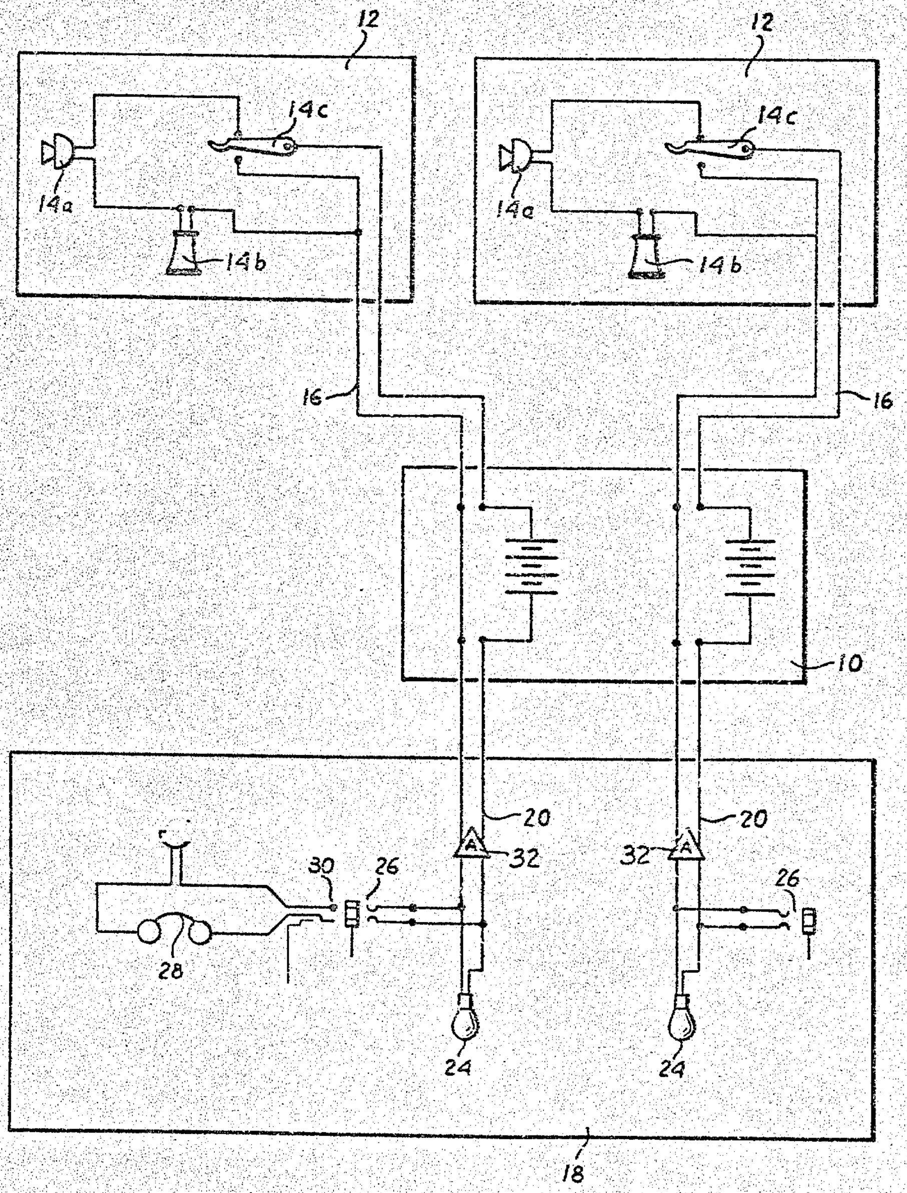
INVENTOR.
AMROSE J. METZ
BY John W. Adams
ATTORNEY 3,169,166

SOUND DETECTION SYSTEM AND ALARM SYSTEM

Ambrose J. Metz, 1917 Aldrich S., Minneapolis, Minn.
Filed Oct. 21, 1959, Ser. No. 847,801
2 Claims. (Cl. 179—5)

This invention relates to systems for detecting noises in unattended buildings.

It is an object of this invention to provide a system for protecting unattended buildings from burglars and vandals and the like by detecting noises made by such intruders in the protected buildings.

It is a particular object to provide such a system which requires the installation of no apparatus in the protected buildings other than a telephone connected to a public telephone system.

It is also an object to provide such a sound detection system in which noises occurring in the protected buildings are picked up by conventional telephone receivers connected to a public telephone system maintaining telephone connection with a central protection office.

It is another object to provide such a system in which noises occurring in the protected buildings are translated into visual signals upon being received at the central protection office so that a single observer can watch over a plurality of protected buildings.

It is an additional object to provide such a protection system in which the observer stationed at the central protection office is provided with earphones permitting him to listen in on the lines communicating with each of the protected buildings.

These and other objects and advantages of this invention will more fully appear from the following description made in connection with the accompanying drawing wherein like reference characters refer to the same or similar parts throughout the several views, in which the figure is a schematic diagram of a sound detection system embodying the present invention.

In the form of the invention shown in the accompanying drawing, a public telephone system having a plurality of telephone lines is shown having an exchange or central office designated by the numeral 10.

A plurality of buildings to be protected against burglary or vandalism are schematically shown by rectangles designated by the numeral 12.

A telephone set including a transmitter 14*a*, a receiver 14*b* and a telephone hook 14*c* is located within each of the protected buildings 12 and is connected to the public telephone system by a telephone electric circuit line 16. In the form shown, the telephone system includes a plurality of conventional telephone sets which may be respectively connected by electric circuit to each of the other sets through the telephone exchange by dialing a number assigned thereto. The transmitter 14*a* included in each telephone set translates sounds received thereby into electric impulses in the electric circuit connected thereto.

A central office 18 of the sound detection system has a plurality of telephone lines 20 to permit the central office 18 to be simultaneously connected by telephone electric circuit to a plurality of telephone sets within the telephone system. In the form shown, a switchboard is provided at the central office 18, having a plurality of visual signal devices such as the light bulbs 24. Each of the bulbs 24 is connected to one of the telephone lines 20.

To initiate protection service, a person in one of the buildings 12 to be protected establishes a telephone circuit connection with the central protection office 18 through the telephone exchange 10 by dialing a telephone number assigned to the office 18 and indicates that the building is to be left unattended. The call is assigned to the switchboard where it is connected to one of the light bulbs 24. The person at the protected building leaves the telephone off the telephone hook 14*c* to maintain a telephone electric circuit connection with the office 18, and departs from the premises leaving the building 12 unattended.

Noises occurring within the vicinity of the telephone set are translated into electrical impulses by the telephone transmitter 14*a* and transmitted to the central protection office 18. Each of the light bulbs 24 is designed to light up in response to transmission thereto of impulses received through the line 20 communicating therewith resulting from noises occurring within pick-up range of the telephone transmitter 14*a* connected with the line 20 through the line 16 and the telephone exchange 10.

A switchboard attendant is stationed at the switchboard to observe the light bulbs 24 connected by telephone with a plurality of protected buildings. When a light bulb 24 on the switchboard lights up in response to a noise picked up in the corresponding building 12 by the telephone transmitter 14*a*, a policeman may be sent to inspect the building to determine the cause of the noise.

The switchboard attendant is provided with means for listening in on the telephone line connected to each of the signal bulbs such as the earphones 28 which may be connected to the circuit through each bulb 24 by inserting a plug 30 into a jack 26 disposed adjacent to each of the bulbs 24. Thus, if the occupant of the building returns thereto unexpectedly and makes noises causing the signal light at the central protection office to register his presence, he may identify himself to the switchboard observer to prevent the sending of an investigator and indicate whether or not he intends to leave the building immediately and if he wishes to maintain sound detection service.

An adjustable amplifier 32 is provided within each of the telephone circuits 20 at the central protection office, as shown in the drawing, to amplify the signals received from the transmitters 14*a* before the signal is transmitted to the light bulb 24. Each bulb 24 is of proper voltage to produce a visual signal upon receiving the amplifier signal from the amplifier 32. The amplifiers 32 are provided with manually operated adjusting means to permit the switchboard observer to amplify the signals when listening through the earphones 28 and thereby magnify and identify sounds of relatively low magnitude occurring remotely from the transmitter 14*a* in the protected premises.

It is anticipated that the various protected premises will be located in different neighborhoods having varying amounts of background noise. In order to prevent normal outside noises from signalling the alarm bulb 24 in the central protection office, each of the amplifiers 32 may be adjusted to amplify the signals received thereby the desired amount to permit the bulbs 24 to respond to a greater or lesser amount of noise at the corresponding protected premises.

In the event that the telephone connection is broken between the protected premises and the central protection office by fire or other damage to the telephone wires 16, the visual signal light bulbs 24 are designed to light up in the same manner as when noises are picked up and transmitted to the central office.

It will be seen that I have provided relatively simple yet highly efficient and inexpensive protection system for buildings having a telephone connected to a public telephone system, which obviates the need for installing any additional equipment in the buildings to be protected. The ease with which the protection system may be initiated makes the system especially useful for obtaining protection service on very short notice and further facilitates protection of private homes when the occupants are to be absent for short or long periods of time.

It will, of course, be understood that various changes may be made in the form, details, arrangements and proportions of parts without departing from the scope of my invention, which generally stated, consists in the manner set forth in the appended claims.

What is claimed is:

1. A protection system for detecting noises in unattended buildings comprising a telephone system having a central telephone exchange, each building to be protected having a telephone set therein including a transmitter, an electric circuit connecting each of said telephone sets to said central telephone exchange, said circuits being responsive to sounds reaching said telephone transmitters, a central protection office having a plurality of telephone lines connected to said telephone exchange, means for establishing said sound responsive electric circuits through said telephone exchange to said central protection office, a telephone switchboard located at said central protection office, a plurality of visual indicating means at said switchboard responsive to actuation to transmission of sounds of predetermined magnitude, each of the electric circuits to the telephone sets in said protected buildings being connected to one of said visual indicating means.

2. The method of detecting and identifying an intruder at a location having a conventional telephone equipment installed therein, said method comprising initially removing the telephone receiver and transmitter from the supporting base thereof and dialing an assigned number to establish a sound transmitting electric circuit through the central telephone exchange to a central monitoring office, amplifying at said monitoring office the signal transmitted from said telephone transmitter, actuating by an amplified signal of predetermined magnitude an indicator at said monitoring office to permit an operator to listen to the actual sounds being transmitted from the telephone transmitter.

References Cited in the file of this patent

UNITED STATES PATENTS

| | | |
|---|---|---|
| 946,259 | Nolen | Jan. 11, 1910 |
| 1,547,873 | Hopkins | July 28, 1925 |
| 2,088,002 | Scott | July 27, 1937 |
| 2,100,206 | Stephens | Nov. 23, 1937 |
| 2,709,251 | Schmidt | May 24, 1955 |
| 2,898,405 | Eck | Aug. 4, 1959 |